United States Patent [19]

Bleiberg

[11] 3,757,403

[45] Sept. 11, 1973

[54] METHOD OF INSERTING NUCLEAR FUEL RODS IN GRID ASSEMBLY

[75] Inventor: Melvin L. Bleiberg, Pittsburgh, Pa.

[73] Assignee: Atlantic Richfield Company, New York, N.Y.

[22] Filed: Apr. 29, 1971

[21] Appl. No.: 138,781

[52] U.S. Cl.................... 29/424, 29/433, 29/458, 176/78
[51] Int. Cl............................................. B23p 17/00
[58] Field of Search...................... 29/424, 447, 433, 29/458; 176/78

[56] References Cited
UNITED STATES PATENTS

| | | | |
|---|---|---|---|
| 2,572,215 | 10/1951 | Swart | 29/424 UX |
| 2,924,876 | 2/1960 | Lewis | 29/458 |
| 2,991,548 | 7/1961 | Henry | 29/424 |
| 3,431,171 | 3/1969 | Glandin | 176/78 |
| 3,600,792 | 8/1971 | Valluy | 176/78 X |
| 3,604,100 | 9/1971 | Tindale | 29/433 |

FOREIGN PATENTS OR APPLICATIONS

| | | | |
|---|---|---|---|
| 423,518 | 2/1935 | Great Britain | 29/447 |

Primary Examiner—Charlie T. Moon
Attorney—John J. McCormack, John D. Peterson, Ernest G. Posner, Blucher S. Tharp and Michael B. Fein

[57] ABSTRACT

A method of inserting metal alloy clad nuclear fuel rods in a fuel rod spacer grid assembly without scratching the clad material comprising forming a hoarfrost-like coating on said rods before inserting them in the assembly.

11 Claims, No Drawings

METHOD OF INSERTING NUCLEAR FUEL RODS IN GRID ASSEMBLY

BACKGROUND OF THE INVENTION

1. Field of the Invention

This invention relates to the manufacture of nuclear fuel rod assemblies. More particularly, the invention relates to a method of assembling fuel rods in a fuel rod grid spacer assembly.

2. Description of the Prior Art

No prior art method of which applicant is aware avoided scratching of the clad material on nuclear fuel rods when they are inserted into fuel rod spacer grid assemblies. This caused a problem which applicant has recognized in that scratching removes part of the protective coating which can cause excessive and unnecessary clad corrosion in nuclear reactor environments, possibly leading to leakage of radioactivity through the cladding. In addition, these scratches act as stress concentration areas which can significantly reduce the fatigue life of a fuel rod subjected to cyclic loading.

SUMMARY OF THE INVENTION

It is therefore an object of the invention to provide a more efficient method of inserting nuclear fuel rods in grid assemblies. It is a further object to provide a method inserting metal alloy clad nuclear fuel rods in fuel rod spacer grid assemblies substantially without scratching said rods, and without producing foreign substances in and on the fuel rod assembly. These and other objects as will become apparent from the following description are achieved by cooling nuclear fuel rods to about 0° C. in a humid atmosphere so as to form a lubricating hoarfrost-like coating on the rod before inserting the rod in the assembly. In another embodiment, the rods are cooled to a temperature below about 0° C. and allowed to warm to a temperature of between about −10 and 0° C. in a humid atmosphere so as to create a semi-porous dry frost lubricating coating on the rod before inserting the rod in the grid assembly.

DETAILED DESCRIPTION OF THE INVENTION AND DESCRIPTION OF THE PREFERRED EMBODIMENTS

The nuclear fuel rods used in the method of this invention are any of the ones known in the art as are clad with known cladding material such as zirconium alloy or stainless steel. In the zirconium alloy case, a protective oxide coating is usually applied in the art by placing the clad rod in a high temperature, high pressure water or steam environment so as to form an oxide coating.

The spacer grid assemblies used in the method of the invention are any of the ones known to the art and are generally composed of special metal alloys suitable for nuclear reactor environments and function to hold the nuclear fuel rods and control rods in fixed spacial relationship to one another. Metallic springs are usually the means by which the fuel rods are held in the spacer grid assembly. The springs form a part of the spacer grid.

When the fuel rod is inserted in the spacer grid assembly according to prior art methods, there was no procedure known to avoid the springs scratching the rods.

In accordance with the invention, a hoarfrost-like deposit is applied to the nuclear fuel rod before it is inserted in the spacer grid assembly. What is meant by "hoarfrost-like deposit" is a semi-porous dry frost resembling hoarfrost. This deposit or coating functions to lubricate and facilitate the insertion of the rod in the assembly.

The hoarfrost-like deposit is preferably formed by cooling the nuclear fuel rod to about 0° C. in a humid atmosphere. Alternatively, the rod can be cooled to a temperature below about 0° C. and allowed to warm to a temperature between about −10° C. and 0° C. in a humid atmosphere.

The cooling means suitable to the method of the invention are any cooling means sufficient to cool the rods to the desired temperature. Dry ice is one suitable cooling means and in this embodiment the rods are held generally on a rack above the dry ice until they are cooled to the desired temperature. Usually, from 1 to 3 minutes is adequate time to form a good frost coating. Another means is cooling coils containing refrigerant such as halogenated hydrocarbon or any other refrigerating equipment known in the refrigeration art.

The humid atmosphere is preferably air and is preferably an environment wherein the relative humidity is between 30 and 70 per cent at 25° C. This humidity has been found to be critical in order to get the special hoarfrost-like semi-porous dry frost lubricating coating which is desired. The following example is presented to illustrate one specific embodiment of the invention.

EXAMPLE

A nuclear fuel rod assembly consisting of 201 rods and seven spacer grids was fabricated as follows. The nuclear fuel rods were clad with zircaloy with a protective oxide coating. Conventional basic grid assemblies were used having springs functioning to hold the nuclear fuel rods in place when inserted. The nuclear fuel rods were held on a rack about 10 inches above a bed of dry ice for about 15 minutes until they reached a temperature of about −40° C. They were then allowed to warm to about 0° C. in a room which had an atmospheric temperature of about 25° C. and a relative humidity of about 40 per cent until a hoarfrost-like deposit formed on the rods, at which time they were inserted into the basic grid assembly. When the rods reached room temperature the hoarfrost-like deposit melted and evaporated and it was seen that the rods were unscratched.

When the exact type of rods were inserted in the exact type of assembly without first forming the hoarfrost-like deposit, they were found to be quite scratched and appeared unpleasing aesthetically, and could, under water chemistry conditions existing in reactors, result in excessive corrosion due to the localized removal of the oxide corrosion film, and possible failure of the cladding. Also, these rods exhibited scratches whose depth was measured as 0.0005 to 0.0020 inches. Scratches of this magnitude are known to act as centers for stress concentration and to reduce the fatigue resistance of the fuel rod cladding. Therefore, under cyclic stress loading, such as swing load operation of the reactor, the allowable number of fatigue cycles could be reduced by the scratches to cause cladding rupture with resultant release of highly radioactive fission products and fuel into the reactor coolant water.

While the invention has been described in considerable detail, it will become apparent to those skilled in the art that various modifications, improvements and alternatives are clearly suggested and do not depart from the spirt and scope of the invention.

I claim:

1. A method of inserting metal alloy clad nuclear fuel rods in a fuel rod spacer grid assembly substantially without scratching said rods comprising cooling said rods to about 0° C. in a humid atmosphere so as to form a lubricating hoarfrost-like coating on said rods and thereafter inserting said rod in said assembly.

2. Method of claim 1 further comprising cooling said rods to a temperature below about 0° C. and allowing said rods to warm to a temperature between about −10° C. and 0° C. in a humid atmosphere.

3. Method of claim 2 wherein said rods are cooled to a temperature between about −35° C. and 45° C.

4. Method of claim 3 wherein said rods are allowed to warm to a temperature between about −4° C. and 4° C.

5. Method of claim 3 wherein said cooling step includes holding said rods in a dry ice environment for a time sufficient to cool said rods to about −40° C.

6. Method of claim 4 further including holding said rods in a dry ice vapor atmosphere for from about 1 to 3 minutes.

7. Method of claim 1 wherein said metal alloy clad material is zirconium alloy, said alloy having a protective oxide coating.

8. Method of claim 1 wherein said metal alloy clad material is stainless steel.

9. Method of claim 1 wherein said humid atmosphere consists of atmosphere having relative humidity between about 30 and 70 per cent.

10. Method of claim 2 wherein said rods are allowed to warm in a room temperature environment.

11. Method of inserting metal covered nuclear fuel rods subject to being scratched into a grid assembly comprising forming a frost coating on said rods prior to inserting, and thereafter inserting said rods into said assembly.

* * * * *